United States Patent [19]

Mason

[11] Patent Number: 4,991,453
[45] Date of Patent: Feb. 12, 1991

[54] CENTRIPEDAL DEVICE FOR CONCENTRATING CENTRIFUGAL FORCE

[76] Inventor: Lyle M. Mason, USS Portsmouth SSN 707, FPO San Francisco, Calif. 96675

[21] Appl. No.: 417,634

[22] Filed: Oct. 5, 1989

[51] Int. Cl.⁵ .................... F16H 33/20; F16H 21/50
[52] U.S. Cl. ...................................... 74/84 R; 74/61
[58] Field of Search ............... 74/61, 84 R, 84 S, 87

[56] References Cited

U.S. PATENT DOCUMENTS 3,404,854 10/1968 Di Bella ........................... 74/84 S

FOREIGN PATENT DOCUMENTS

| 213927 | 6/1956 | Australia | 74/61 |
| 704568 | 3/1965 | Canada | 74/84 S |
| 1935794 | 2/1971 | Fed. Rep. of Germany | 74/61 |
| 61-233243 | 10/1986 | Japan | 74/84 R |
| 757209 | 8/1980 | U.S.S.R. | 74/87 |

Primary Examiner—Allan D. Herrmann
Attorney, Agent, or Firm—Richard C. Litman

[57] ABSTRACT

A centripedal force concentrator having a main rotating shaft with one or more arms extending perpendicularly from the central main shaft. Rotating gears having extending weighted armlets are attached at the far end of the arms. Secondary shafts are disposed between a surrounding geared collar and the rotating gears, such that when the central shaft is rotated the rotating gears are turned by the secondary shafts. The rotating weighted armlets cause variations in the centripedal force giving a net resultant force. Pairing synchronized devices can eliminate cross torque of a single device.

10 Claims, 2 Drawing Sheets

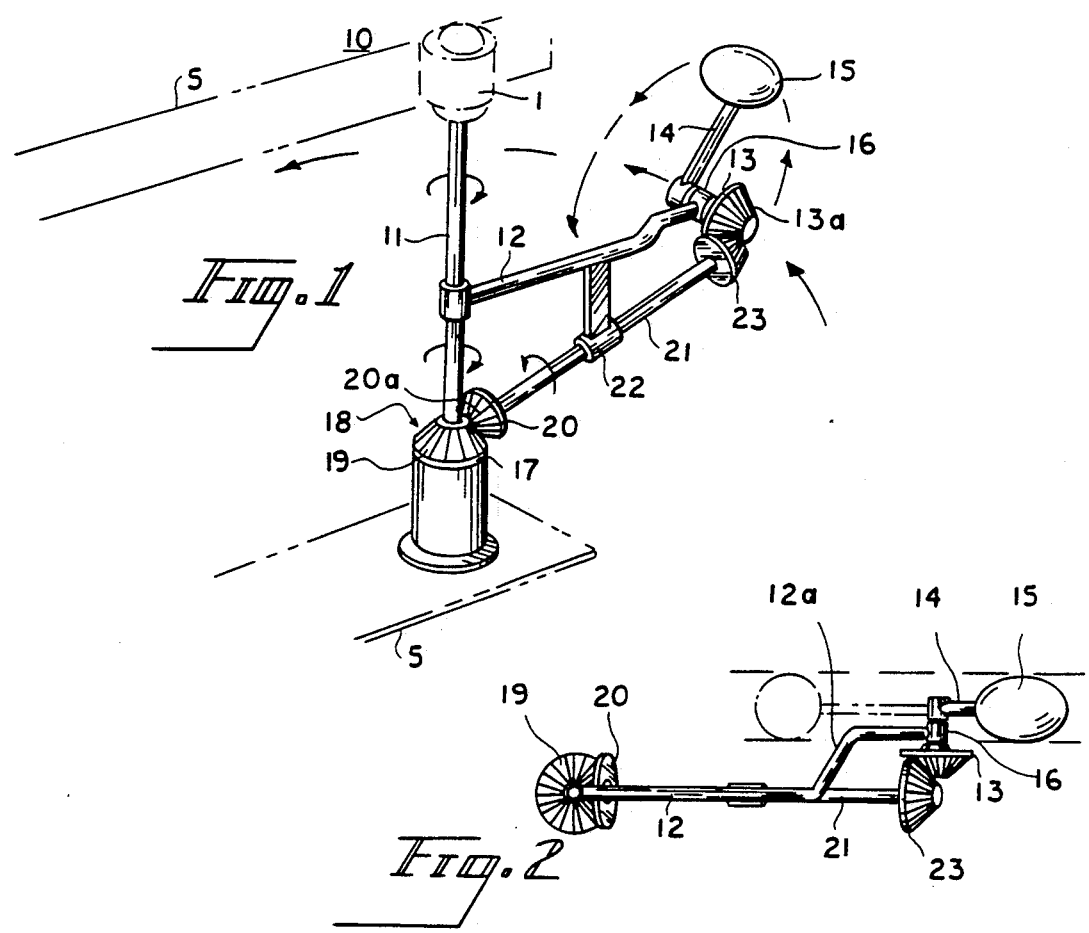
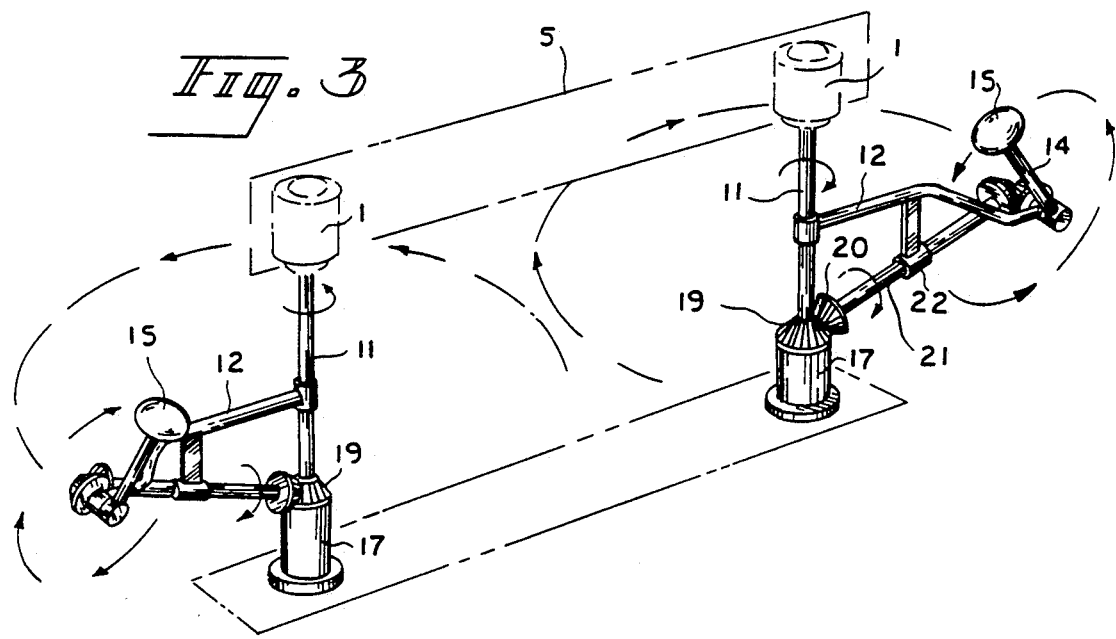

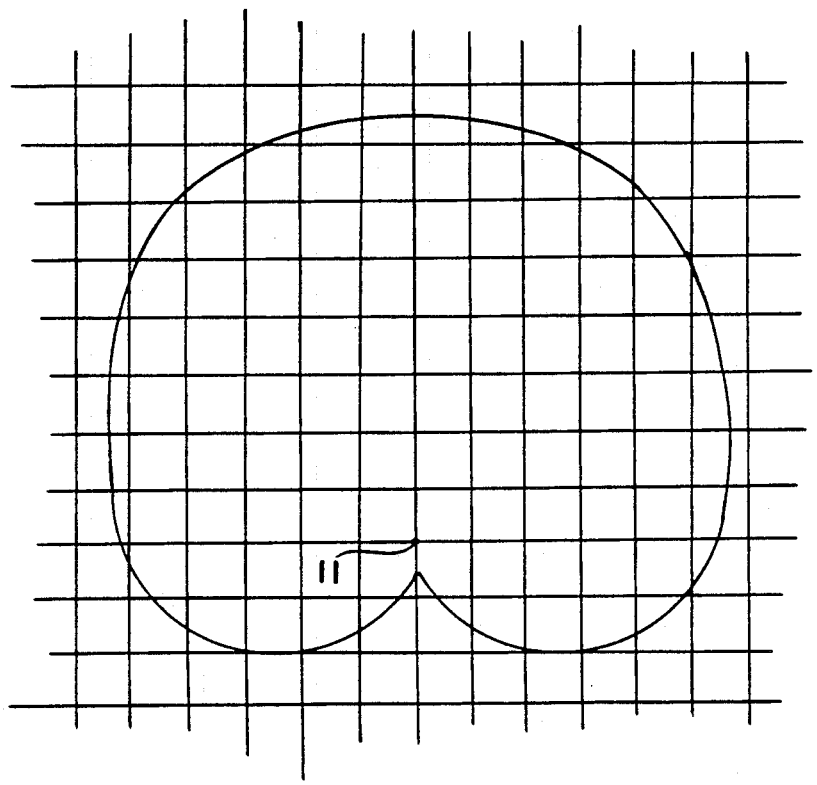

CENTRIPEDAL DEVICE FOR CONCENTRATING CENTRIFUGAL FORCE

BACKGROUND OF THE INVENTION

1. Field of the Invention

The present invention relates to the field of converting rotary motion into a net linear motion. More particularly it relates to a rotary device having a varying centrifugal force in two dimensions. Such forces when reacting against a medium, whose response to force is non-linear, can result in net motion.

2. Description of the Prior Art

The following is a discussion of patents felt to related to the present invention, but not disclosing either singly or in combination the present invention.

U.S. Pat. No. 1,468,223 issued to Baltich discloses a centrifugal launching device comprising a rod and an arrow-type projectile attached to the rod by means of two cords and a resilient member.

U.S. Pat. No. 4,677,961 issued to Allison discloses a throwing device comprising an elongated handle with a trough-like projectile carrier pivotally mounted on its end and imparting velocity to the projectile in response to the arcuate swinging of the handle.

U.S. Pat. No. 3,555,915 issued to Young, Jr. discloses a mechanism comprising swingable weighted shafts rotated around the main shaft to create unbalanced centrifugal and gyratory forces.

None of the prior art patents cited above disclose armlets such as disclosed by the applicant that cyclically change their radius and center of mass thus leading to a varying amount of centrifugal force in one direction.

SUMMARY OF THE INVENTION

The present invention comprises a vertical shaft rotating in a frame, an arm fixed to the shaft, and a secondary arm or armlet rotating relative to the end of the primary arm. The axis of this armlet rotation is horizontal. A mass is attached to the moving end of the armlet. Gears are provided to cause the armlet to rotate relative to the arm whenever the shaft rotates relative to the frame. Thus when the shaft rotates, the mass describes a complex motion which is the summation of two circular motions, one in a horizontal plane and one in a vertical plane. A motor drives the device through the shaft.

In operation, the device is attached to a vehicle. The varying centrifugal forces developed react on a medium in which the vehicle is immersed or on which it rests. If the medium has a non-linear response to forces, the vehicle can move through the medium. An example of this kind of motion is the unidirectional motion of a ratchet and pawl under violent to-and-fro shaking.

The use of a single one of the above described devices will yield a cross torque. Therefore, to eliminate the cross torque, two of the devices can be placed side by side with opposite directions of rotation. This will yield a varying force along a straight line direction.

Accordingly, it an object of the present invention to provide a centrifugal force concentrator that converts rotary motion to a net linear resultant motion.

It is another object of the present invention to provide a centrifugal force concentrator having a central rotating shaft and an extending arm.

It is a further object of the present invention to provide a centrifugal force concentrator having a geared collar surrounding the central shaft.

It is yet another object of the present invention to provide a centrifugal force concentrator having a weighted rotating armlet disposed at the end of the arm to vary the centrifugal force.

It is a still further object of the present invention to provide a centrifugal force concentrator having means to impart rotary motion to the armlet from the surrounding collar of the central shaft.

It is another object of the present invention to provide a centrifugal force concentrator that eliminates cross torque and provides force in a linear direction.

These and other objects of the present invention will become readily apparent upon further review of the following specification and drawings.

BRIEF DESCRIPTION OF THE DRAWINGS

FIG. 1 depicts a perspective view of the device showing the shaft and arm.

FIG. 2 depicts a top view of the device showing connection between the armlet and the arm.

FIG. 3 depicts a perspective view of the usage of two of the devices in a side by side relationship.

FIG. 4 depicts the orbital path of the weighted armlet.

Similar reference characters denote corresponding features consistently throughout the attached drawings.

A DETAILED DESCRIPTION OF THE PREFERRED EMBODIMENT

The present device of a centrifugal force concentrator 10 is shown in FIG. 1. It includes a central main shaft 11 that is connected to a power source 1 that rotates it, such as an electric motor. The power source 1 is attached to a frame 5. Extending perpendicularly from the central shaft 11 is an arm 12. Arm 12 is fixed to shaft 11 for rotation therewith. Disposed on the end of this arm 12 is a rotating gear 13 having teeth 13a. The end of arm 12 has a bearing 16, best shown in FIG. 2, through which gear 13 is connected to an armlet 14. On the outer end of the armlet 14 is a weight or mass 15. Armlet and gear are able to rotate clear of the arm 12 because of the bearing 16 and the fact that arm 12 has a bend 12a to allow the gears 13 and 23 to properly intermesh. The armlet 14 has a total length that is slightly less than that of the arm 12. This allows the weight 15 to clear the central shaft 11 when it rotates.

Surrounding the central shaft 11 is a collar 17 that has an inclined face 18 with gearing teeth 19. The collar 17 does not rotate, and so the teeth 19 are also stationary with respect to shaft 11. The bottom of shaft 11 would be held by a bearing(not shown) inside the collar 17. The bearing 17 rests upon the frame 5. Engaging this collar 17 is a gear 20 having mating teeth 20a. This gear 20 is at one end of a secondary shaft or axle 21 that is connected to arm 12 by a second bearing 22 allowing axle 21 to rotate due to the motion imparted by the engaging collar 17 and gear 20 when shaft 11 rotates. The other end of this secondary shaft axle has another gear 23 that engages with the inclined face of rotating gear 13. Axle 21 is what powers rotating gear 13 and subsequently the armlet 14 with the weight 15. The resultant motion of the rotation of central shaft 11 is that armlet 14 and the weight 15 rotate about the bearing 16 and the gear 13.

A diagram of the orbital path of the weight 15 is shown in FIG. 4. The path shown has a generally heart shape to it. The radius of the weight 15 from the central shaft 11 varies periodically over time. The tooth ratio of gear 17 / gear 20 should equal that of gear 13 / gear 23 to maintain a regular pattern over time, meaning that when gear 20 has completed a full circuit around collar 17, gear 23 should have made a complete circuit of gear 13. Ideally, all the gears should have the same size and number of teeth to simplify things. This will yield constant direction for the resultant force. Since in circular motion Force=$Mv^2/r$, where M is the mass, v is the velocity and r is the radius from the center of rotation, the Force will vary because the radius for the center of mass of the armlet 14, arm 12 and the weight 15 is periodically varying. There will be a net resultant centrifugal force over time in a certain direction. That direction is along the line defined by the full extension of armlet 14.

The use of a single one of these devices 10 will yield an unbalanced cross force because of the single rotating element. The use of two of these devices 10, as shown in FIG. 3, rotating in synchronized opposite directions balances out the cross force normal to the dirction of travel. This would help to eliminate any vibration due to the cross force in a direction normal to that of travel. The resultant motion would be in the direction of travel only. This would give a smooth ride in a vehicle moving by reacting against a medium.

It is also possible to include more than one arm 12 on the device. Included with these additional arms 12 would be corresponding rotating gears 13 and armlets 14 with weights 15. These additional assemblies can be used to adjust torque and the resultant force of the device 10. Adjusting the synchronization of the various rotating armlets 14 would adjust the torque and force properties of the device 10.

It is to be understood that the present invention is not limited to the sole embodiment described above, but encompasses any and all embodiments within the scope of the following claims.

I claim:

1. A centrifugal force apparatus comprising:
 a frame;
 a vertical shaft rotatably mounted on said frame;
 a bearing having an axis of rotation;
 an arm having an inner end fixed to said shaft, and an outer end distant from said shaft fixed to said bearing;
 said axis of rotation of said bearing horizontal, and said axis of rotation normal to a vertical plane defined by said shaft and said arm;
 an armlet having a first end and a second end, said first end rotatably engaging said bearing to allow said armlet to rotate in a vertical plane relative to said arm;
 a mass attached to said second end of said armlet, and
 powering means to cause rotation of said vertical shaft and of said armlet relative to said arm, whereby
 said mass moves in cycles and epicycles and exerts forces on said frame in the vertical direction and in the horizontal direction.

2. An apparatus as in claim 1 including
 angular means to insure that horizontal angular displacements of said arm relative to said frame and vertical angular displacements of said armlet relative to said arm are equal, whereby
 said mass executes one full vertical circle as it executes one full horizontal circle.

3. A device according to claim 2 including a pair of said apparatuses, said pair comprising a first apparatus and a second apparatus, wherein
 said vertical shaft of said first apparatus is parallel to said shaft of said second apparatus,
 the circular motion in a vertical plane of the mass of the first apparatus is in phase with the circular motion in a vertical plane of the mass of the second apparatus, and
 the circular motion in a horizontal plane of the arm of the first apparatus is half of a full rotation out of phase with the circular motion in a horizontal plane of the arm of the second apparatus, whereby
 horizontal forces of the two apparatuses cancel.

4. An apparatus as in claim 3 wherein
 said angular means includes
 an axle having an inner end and an outer end, an inner bevel gear fixed at said inner end, an outer bevel gear fixed at said outer end,
 a stationary bevel gear surrounding said shaft, fixed to said frame, and meshing with said inner bevel gear, and
 an armlet bevel gear meshing with said outer bevel gear, said armlet bevel gear fixed to said armlet, whereby
 rotation of said shaft relative to said frame causes rotation of said armlet relative to said arm.

5. A device according to claim 4 including a pair of said apparatuses, said pair comprising a first apparatus and a second apparatus, wherein
 said vertical shaft of said first apparatus is parallel to said shaft of said second apparatus,
 the circular motion in a vertical plane of the mass of the first apparatus is in phase with the circular motion in a vertical plane of the mass of the second apparatus, and
 the circular motion in a horizontal plane of the arm of the first apparatus is half of a full rotation out of phase with the circular motion in a horizontal plane of the arm of the second apparatus, whereby
 horizontal forces of the two apparatuses cancel.

6. An apparatus as in claim 1 wherein
 said shaft does not lie within an armlet rotation plane defined by said mass moving relative to said armlet, whereby
 said mass does not move within said vertical plane defined by said shaft and said arm.

7. An apparatus as in claim 6, including
 angular means to insure that horizontal angular displacements of said arm relative to said frame and vertical angular displacements of said armlet relative to said arm are equal, whereby
 said mass executes one full vertical circle as it executes one full horizontal circle.

8. A device according to claim 7 including a pair of said apparatuses, said pair comprising a first apparatus and a second apparatus, wherein
 said vertical shaft of said first apparatus is parallel to said shaft of said second apparatus,
 the circular motion in a vertical plane of the mass of the first apparatus is in phase with the circular motion in a vertical plane of the mass of the second apparatus, and
 the circular motion in a horizontal plane of the arm of the first apparatus is half of a full rotation out of phase with the circular motion in a horizontal plane of the arm of the second apparatus, whereby horizontal forces of the two apparatuses cancel.

9. An apparatus as in claim 7 wherein said angular means includes an axle having an inner end and an outer end, an inner bevel gear fixed at said inner end, an outer bevel gear fixed at said outer end, a stationary bevel gear surrounding said shaft, fixed to said frame, and meshing with said inner bevel gear, and an armlet bevel gear meshing with said outer bevel gear, said armlet bevel gear fixed to said armlet, whereby rotation of said shaft relative to said frame causes rotation of said armlet relative to said arm.

10. A device according to claim 9 including a pair of said apparatuses, said pair comprising a first apparatus and a second apparatus, wherein said vertical shaft of said first apparatus is parallel to said shaft of said second apparatus, the circular motion in a vertical plane of the mass of the first apparatus is in phase with the circular motion in a vertical plane of the mass of the second apparatus, and the circular motion in a horizontal plane of the arm of the first apparatus is half of a full rotation out of phase with the circular motion in a horizontal plane of the arm of the second apparatus, whereby horizontal forces of the two apparatuses cancel.

* * * * *